(12) United States Patent
Kwag et al.

(10) Patent No.: US 10,788,218 B2
(45) Date of Patent: Sep. 29, 2020

(54) ELECTROMAGNETIC INDUCTION HEATING COOKING APPLIANCE

(71) Applicant: LG ELECTRONICS INC., Seoul (KR)

(72) Inventors: Dongseong Kwag, Seoul (KR); Yangkyeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 245 days.

(21) Appl. No.: 15/989,375

(22) Filed: May 25, 2018

(65) Prior Publication Data

US 2018/0340692 A1 Nov. 29, 2018

(30) Foreign Application Priority Data

May 25, 2017 (KR) .................. 10-2017-0064858

(51) Int. Cl.
*H05B 6/12* (2006.01)
*F24C 7/06* (2006.01)
(Continued)

(52) U.S. Cl.
CPC ............. *F24C 7/062* (2013.01); *A47J 27/004* (2013.01); *A47J 37/0635* (2013.01);
(Continued)

(58) Field of Classification Search
CPC .. F24C 7/04; F24C 7/043; F24C 7/046; F24C 7/06; F24C 7/062; F24C 7/065;
(Continued)

(56) References Cited

U.S. PATENT DOCUMENTS

| 2007/0163567 A1* | 7/2007 | Kaneko | F24C 15/006 126/21 A |
| 2010/0206867 A1* | 8/2010 | Acero Acero | H05B 6/065 219/468.1 |

(Continued)

FOREIGN PATENT DOCUMENTS

| JP | 3796856 | 7/2006 |
| JP | 5887234 | 3/2016 |

(Continued)

OTHER PUBLICATIONS

International Search Report and Written Opinion dated Feb. 22, 2018 issued in Application No. PCT/KR2017/009887.

(Continued)

*Primary Examiner* — Hung D Nguyen
(74) *Attorney, Agent, or Firm* — KED & Associates LLP (57) ABSTRACT

An electromagnetic induction heating cooking appliance may include a heating plate comprising a magnetic substance, a cooking space in which the heating plate is accommodated, an electromagnetic induction heater that supplies an induced current to the heating plate, and a heat emitter that emits heat so as to heat food placed on the heating plate. The electromagnetic induction heater and the heat emitter may be disposed on different sides of the cooking space, respectively. The electromagnetic induction heating cooking appliance may further include a water storage groove that generates steam in the cooking space when water is placed in the water storage groove.

13 Claims, 5 Drawing Sheets

(51) Int. Cl.
*A47J 37/06* (2006.01)
*A47J 27/00* (2006.01)
*F24C 7/04* (2006.01)
*H05B 6/06* (2006.01)

(52) U.S. Cl.
CPC ........... *A47J 37/0664* (2013.01); *F24C 7/043* (2013.01); *H05B 6/062* (2013.01); *H05B 6/129* (2013.01); *H05B 6/1209* (2013.01)

(58) Field of Classification Search
CPC .. F24C 7/067; F24C 7/08; F24C 7/082; F24C 7/087; A47J 27/004; A47J 27/04; A47J 37/0629; A47J 37/0635; A47J 37/0664; A47J 37/0676; H05B 6/062; H05B 6/065; H05B 6/12; H05B 6/1209; H05B 6/1236; H05B 6/1245; H05B 6/129
USPC ........ 219/391, 400, 401–411, 620, 622, 624, 219/627, 667, 675
See application file for complete search history.

(56) References Cited

U.S. PATENT DOCUMENTS

2018/0263084 A1* 9/2018 Yoshino ................... H05B 6/12
2019/0021142 A1* 1/2019 Mizuta ................... H05B 6/129

FOREIGN PATENT DOCUMENTS

| JP | 2016-207400 | 12/2016 |
| JP | 6101649 | 3/2017 |
| JP | 2017-084814 | 5/2017 |
| JP | 2017-84814 A * | 5/2017 |

OTHER PUBLICATIONS

Korean Office Action dated Oct. 29, 2018 issued in Application No. 10-2017-0064858.

\* cited by examiner

ELECTROMAGNETIC INDUCTION HEATING COOKING APPLIANCE

CROSS-REFERENCE TO RELATED APPLICATION(S)

This application claims the priority of Korean Patent Application No. 10-2017-0064858 filed in Korea on May 25, 2017, in the Korean Intellectual Property Office, the disclosure of which is hereby incorporated by reference in its entirety.

BACKGROUND

Field

An electromagnetic induction heating cooking appliance is disclosed herein.

2. BACKGROUND

Typically, a cooking appliance is used to cook various foods or other items (hereinafter "food"), such as rice, soup, and stew, or to warm up food with heating devices. An electromagnetic induction heating cooking appliance is used to cook food by generating heat with an electromagnetic force. It utilizes the principle that when a metal is placed in a changing magnetic field, an eddy current is generated by electromagnetic induction, such that heat is generated in the metal by the current.

Various products, such as a microwave oven using microwaves, a microwave oven using a heat generator, and a cooktop, for example, are widely used as cooking appliances. The microwave oven heats food using electromagnetic radiation, generated by a magnetron in a sealed cooking chamber, to vibrate water molecules in the food, thereby producing thermal energy. The oven uses a heater or heat generator to heat a sealed cooking chamber, thereby heating food contained therein.

In existing cooking appliances, a heating unit or heater is disposed only on one side of a cooking space, and thus decreases heating efficiency. In addition, it is often necessary to change the orientation of food or flip it to ensure that all sides of the food is heated or cooked. In existing cooking appliances, a door is coupled with a main body via a hinge. It may therefore be difficult to put food or a food container into the cooking chamber of the cooking appliance without spilling the contents.

In existing cooking appliances, food is heated with only one of either an infrared heater or by electromagnetic induction heating, such that heat cannot be transferred efficiently. Existing cooking appliances have no capability of supplying water on their own and thus cannot generate steam when heating food.

An existing pop-up toaster is very difficult to clean. An existing oven type cooking appliance is also difficult to clean due to an infrared heat generator or infrared heater at its bottom.

BRIEF DESCRIPTION OF THE DRAWINGS

Embodiments will be described in detail with reference to the following drawings in which like reference numerals refer to like elements, and wherein.

DETAILED DESCRIPTION

Figure 1:
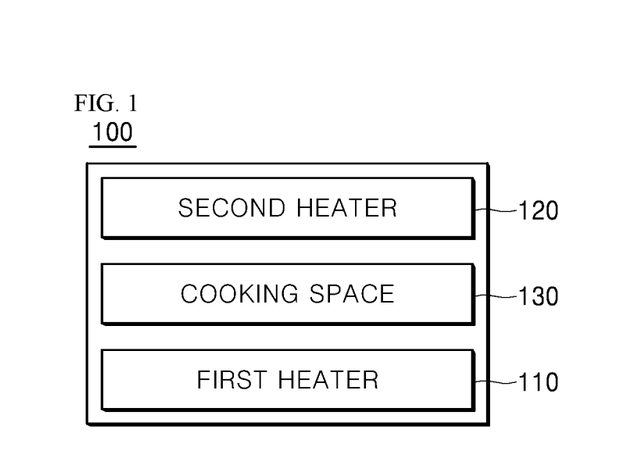
FIG. 1 is a block diagram illustrating a cooking appliance according to an embodiment.

FIG. 1 is a block diagram illustrating a cooking appliance according to an exemplary embodiment. As shown in FIG. 1, a cooking appliance 100 may include a first heater 110 provided on one or a first side of a cooking space 130, and a second heater 120 provided on another or a second side of the cooking space 130. As the two heaters are provided as described above, food placed in the cooking space 130 can be heated more efficiently.

Figure 2:
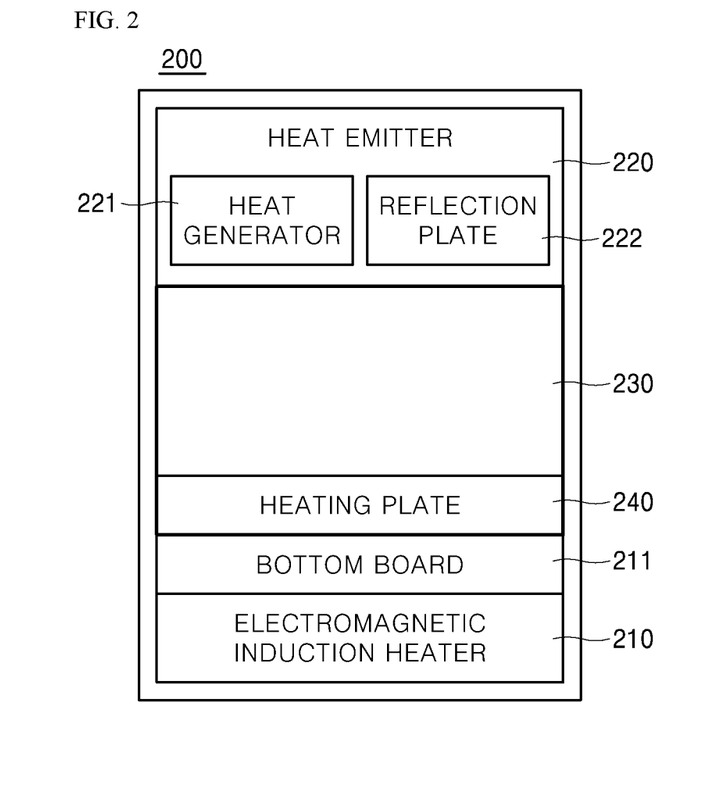
FIG. 2 is a block diagram illustrating an electromagnetic induction heating cooking appliance as an example of the cooking appliance shown in FIG. 1.

FIG. 2 is a block diagram illustrating an electromagnetic induction heating cooking appliance as an example of the cooking appliance shown in FIG. 1. As shown in FIG. 2, an electromagnetic induction heating cooking appliance 200 may include a first heater, an electromagnetic induction heater 210, provided on one or a first side of a cooking space 230, and a second heater, a heat emitter 220, provided on another or a second side of the cooking space 230. The cooking space 230 may include a heating plate 240 heated by an induced current from the electromagnetic induction heater 210. The heating plate 240 may include a magnetic substance.

The electromagnetic induction heater 210 may include a bottom board 211 that supports the heating plate 240. The bottom board 211 may be a ceramic plate so that an induced current may pass therethrough. The heat emitter 220 may include a heat generator 221 and a reflection plate 222. The heat generator 221 may produce heat to heat or cook food placed on the heating plate 240. The reflection plate 222 may reflect the heat produced from the heating plate 240 back onto the food placed on the heating plate 240.

Figure 3:
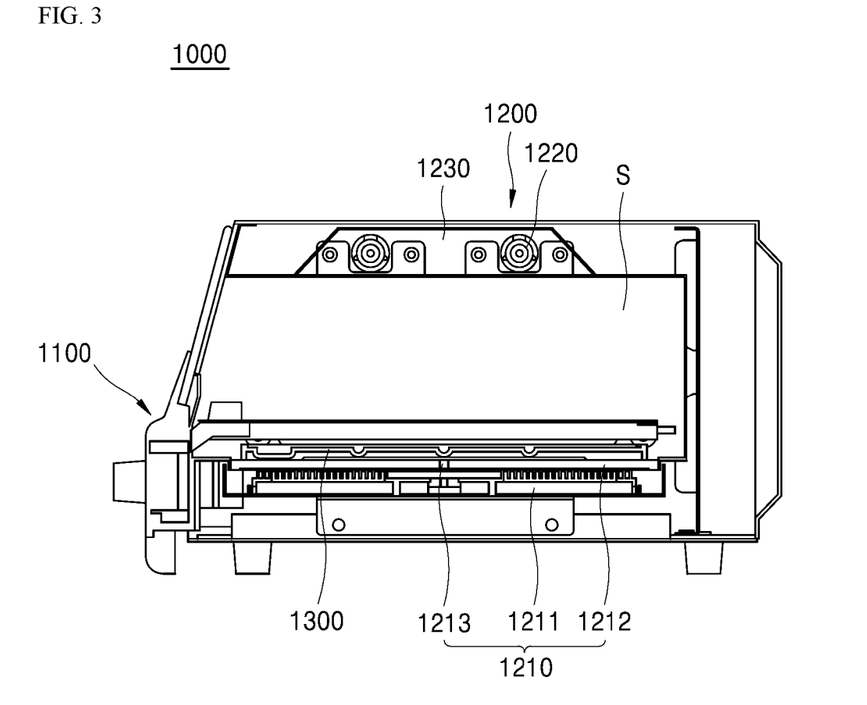
FIG. 3 is a diagram schematically showing an electromagnetic induction heating cooking appliance according to an exemplary embodiment.
Figure 4:
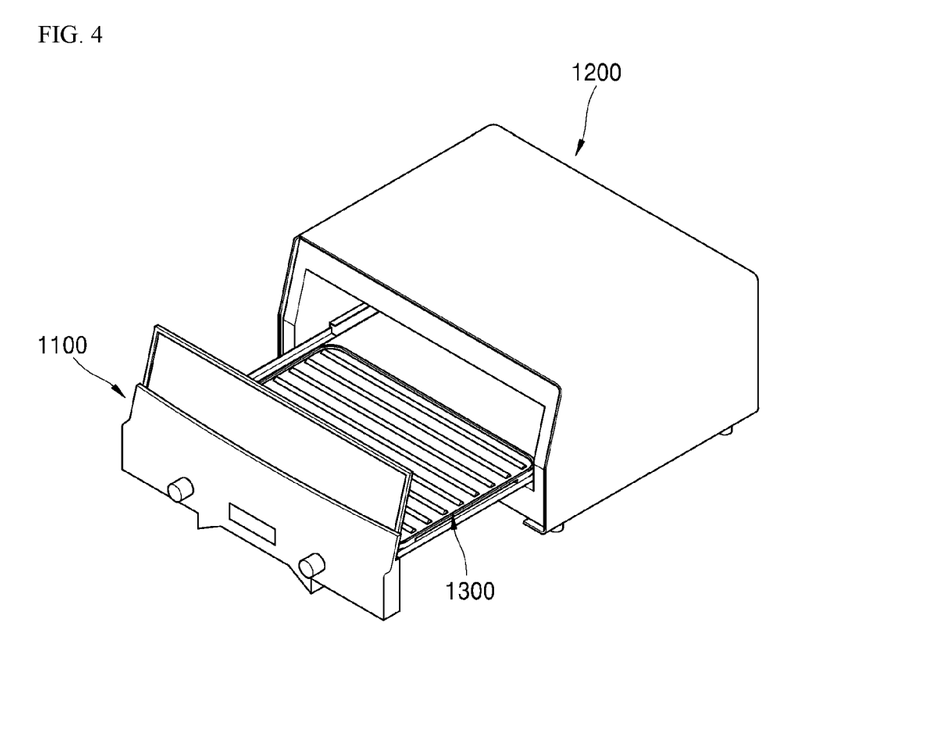
FIG. 4 is a diagram showing the cooking appliance shown in FIG. 1 in use.
Figure 5:
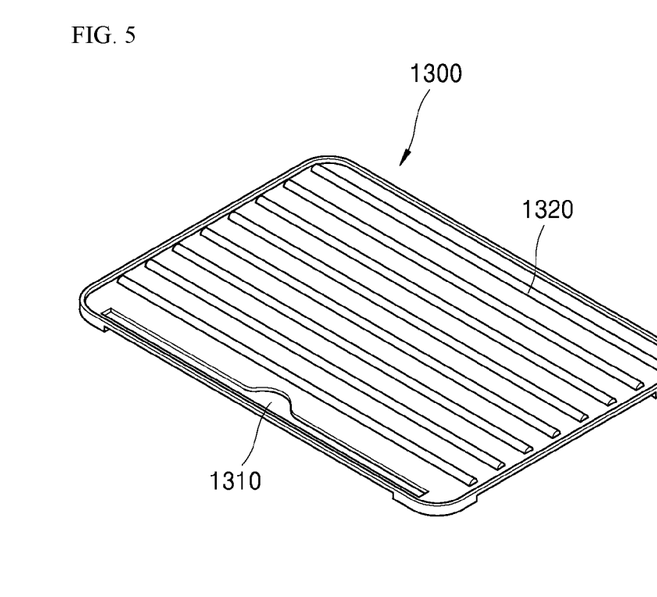
FIG. 5 is a perspective view of a heating plate of the cooking appliance shown in FIG. 1.

FIG. 3 is a diagram schematically showing an electromagnetic induction heating cooking appliance according to an exemplary embodiment. FIG. 4 is a diagram showing the cooking appliance shown in FIG. 1 in use. FIG. 5 is a perspective view of a heating plate of the cooking appliance shown in FIG. 1. As shown in FIG. 3, a cooking appliance 1000 may include a door 1100, a main body 1200, and a heating plate 1300.

More specifically, the main body or body 1200 may include an electromagnetic induction heater 1210 that provides an induced current to the heating plate 1300, and also may include an infrared heat generator 1220 in order to heat food or a food container placed on the heating plate 1300 and accommodated in a cooking space S. The electromagnetic induction heater 1210 may be provided at a lower portion of the main body 1200 such that it generates heat in an upward direction. An infrared heat generator 1220 may be provided at an upper portion of the main body 1200.

The door 1100 may be detachably coupled to the main body 1200 to open and close the cooking space S formed in the main body 1200. The heating plate 1300 may be coupled to the door 1100. When the door 1100 opens the cooking space, the heating plate 1300 may be drawn out of the cooking space S. When the door 1100 closes the cooking space S, the heating plate 1300 may be inserted into the cooking space S.

The heating plate 1300 may be made of a magnetic material that is heated by an induced current. In addition, as shown in FIG. 5, a water storage groove 1310 that may generate steam may be formed in the heating plate 1300. Further, the heating plate 1300 may be provided with protrusions 1320 that form grill marks. Also, the heating plate 1300 may be detachably coupled to the door 1100 so that it may be cleaned separately from the rest of the appliance. The electromagnetic induction heater 1210 may include a working coil 1211, a bottom board 1212, and a temperature sensor 1213. The working coil 1211 may provide an induced current to the heating plate 1300, and the heating plate 1300 may generate heat via the induced current provided by the working coil 1211.

The bottom board 1212 may support the heating plate 1300 and may be made of a ceramic plate through which induced current may pass. In addition, the temperature sensor 1213 may measure a temperature of the heating plate 1300 and may contact a central portion of the heating plate 1300. A hole may be formed in the bottom board 1212, and the temperature sensor 1213 may be inserted into the hole to measure the temperature of the heating plate 1300. Alternatively, the temperature of the heating plate 1300 may be measured without contact by making a portion of the bottom board 1212 transparent and by using a non-contact temperature sensor. The electromagnetic induction heater 1210 may be provided at a lower portion of the main body 1200 such that it generates heat upwards. An infrared heat generator 1220 may be provided at an upper portion of the main body 1200. A reflection plate 1230 may be mounted at the upper portion of the main body 1200. The reflection plate 1230 may reflect heat emitted from the heating plate 1300 back to the food or a food container placed on the heating plate 1330.

As described above, the electromagnetic induction heating cooking appliance 1000 according to an embodiment may include the electromagnetic induction heater 1210 provided on or at one or a first side of the cooking space S and the infrared heat generator 1220 provided on or at another or a second side of the cooking space S, such that food placed on a heating plate 1300 can be cooked more efficiently and conveniently. The heating plate 1300 may be removed from the door 1100 such that it is easy to be maintained and cleaned. Moisture may be supplied when steam is generated from water stored in a water storage groove 1310 formed in the heating plate 1300.

Figure 6:
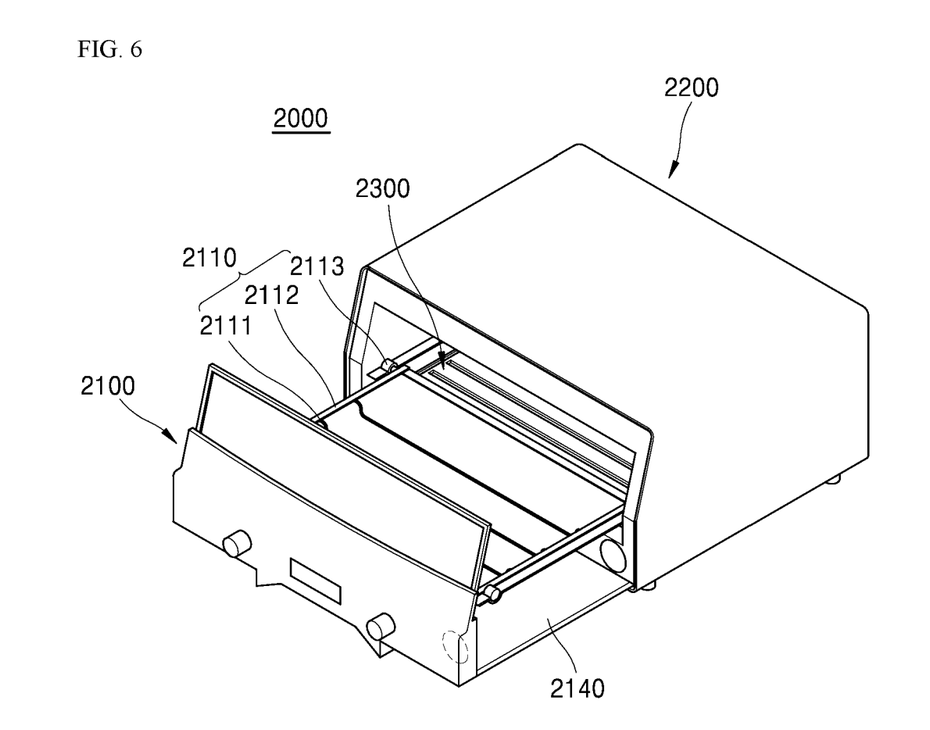
FIG. 6 is a diagram schematically showing an oven cooking appliance according to an exemplary embodiment.
Figure 7:
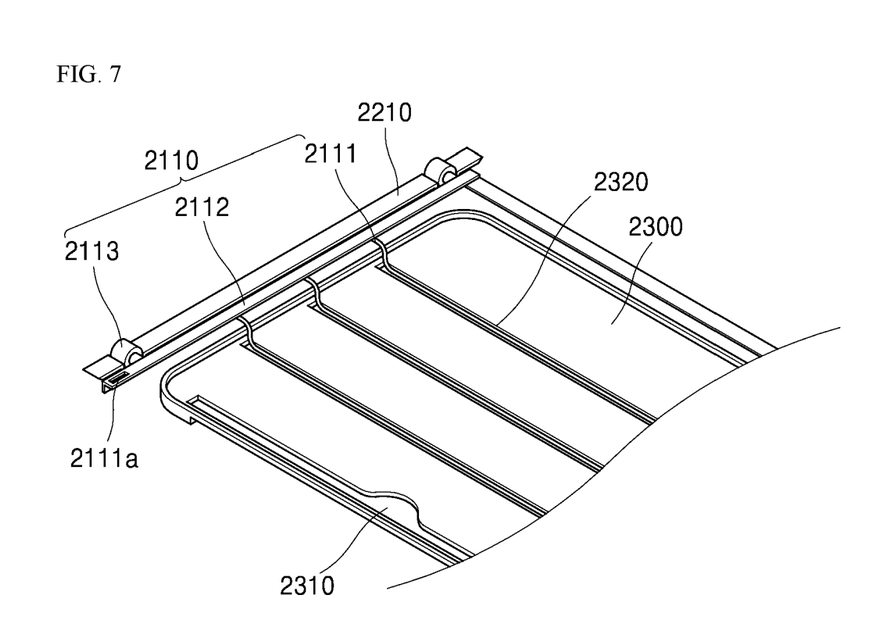
FIG. 7 is a diagram illustrating a heating plate of the oven cooking appliance shown in FIG. 6 when a door is closed.
Figure 8:
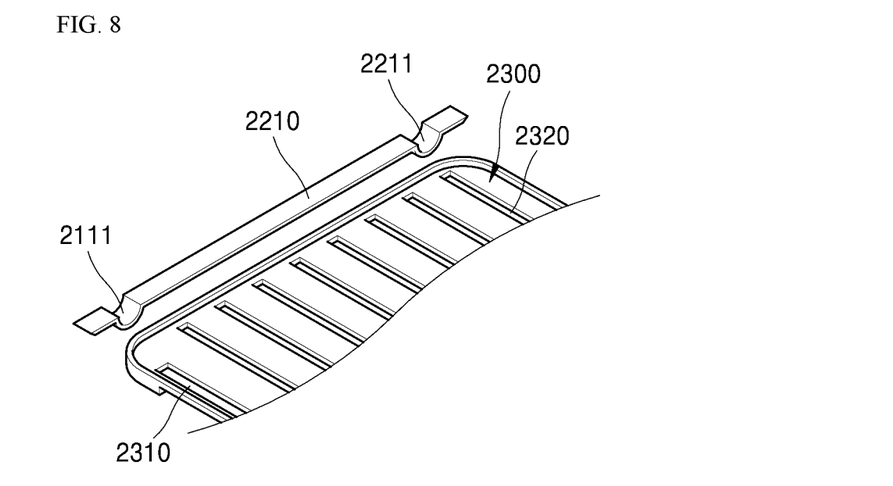
FIG. 8 is a diagram illustrating the heating plate of the oven cooking appliance shown in FIG. 6 when the door is opened.

FIG. 6 is a diagram schematically showing an oven cooking appliance according to an embodiment. FIG. 7 is a diagram illustrating a heating plate of the oven cooking appliance shown in FIG. 6 when a door is closed. FIG. 8 is a diagram illustrating the heating plate of the oven cooking appliance shown in FIG. 6 when the door is opened. A cooking appliance 2000 according to an embodiment may be identical to the cooking appliance 1000 shown in FIG. 1, except in a location of the heating plate and in a configuration of the door. The cooking appliance 2000 may include a door 2100, a main body 2200, and a heating plate 2300.

An electromagnetic induction heater 1210 (see FIG. 3) and an infrared heat generator 1220 (see FIG. 3) may be mounted on two sides of the main body 2200. A reflection plate 1230 (see FIG. 3) may be mounted on an upper portion of the main body 2200. The door 2100 may include a holding portion 2110. The holding portion 2110 may hold or store food or a food container. When the door 2100 opens the cooking space S of the main body 2200, the holding portion 2110 may be drawn out from the cooking space S. When the door 2100 closes the cooking space S, the holding portion 2110 may be inserted into the cooking space S and may come into contact with the heating plate 2300.

The holding portion 2110 may include wires 2111, holding members 2112, and wheels 2113. The holding portion 2110 may be formed by coupling the wires 2111 to a pair of holding members 2112 facing each other, and by coupling wheels 2113 to both sides of the holding members 2112, respectively. The main body 2200 may include a guide frame 2210 that may guide movement of the holding portion 2110. In the guide frame 2210, seating grooves 2211 may be formed. Each of the wheels 2113 of the holding portion 2110 may be inserted into the seating grooves 2211.

The seating grooves 2211 may be provided at a location corresponding to a location of each of the wheels 2113 when the door 2100 is drawn into the main body 2200 to cover the cooking space S, and may also correspond to the location of each of the wheels 2113 when the door 2100 is drawn out of the cooking appliance 2000 as far as possible. The holding portion 2110 may have a door coupling groove 2112a so that it can be detachably coupled with the door 2100. The door may have a coupling protrusion that fits into the door coupling groove 2111a. A water storage groove 2310 that may generate steam may be formed in the heating plate 2300, along with a wire insertion groove 2320 in which the wires 2111 are inserted.

Figure 9:
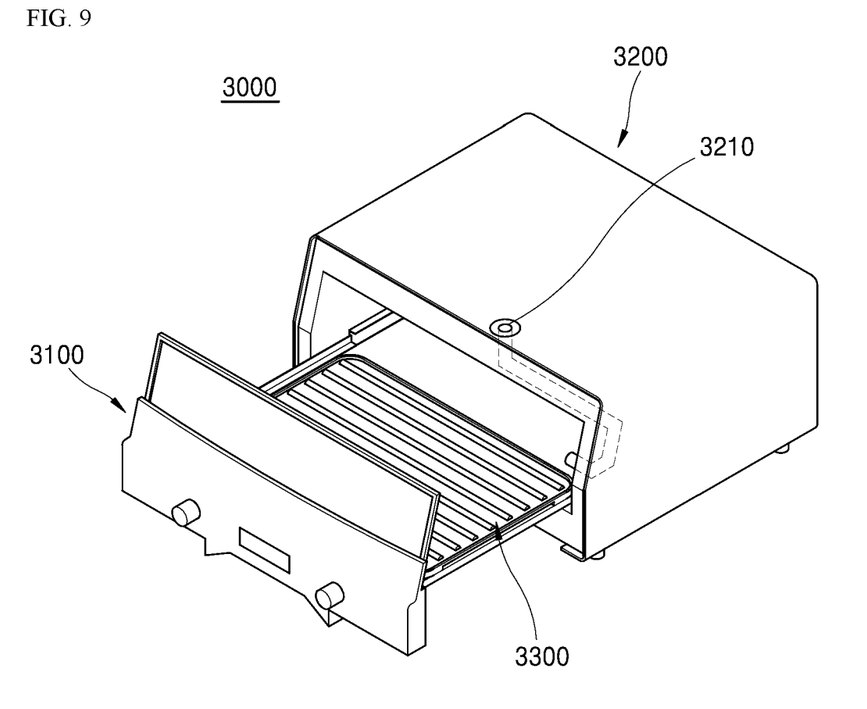
FIG. 9 is a block diagram schematically showing a cooking appliance according to an exemplary embodiment.

FIG. 9 is a block diagram schematically showing a cooking appliance according to an embodiment. As shown in FIG. 9, a cooking appliance according to this embodiment may be identical to the cooking appliance shown in FIG. 3 except that a water channel may be provided. More specifically, the cooking appliance 3000 may include a door 3100, a main body 3200, and a heating plate 3300.

An electromagnetic induction heater 1210 (see FIG. 3) and an infrared heat generator 1220 (see FIG. 3) may be mounted on two different sides of the main body 3200, respectively. A reflection plate 1230 (see FIG. 3) may be mounted on an upper portion of the main body 3200.

The main body 3200 may include a water channel 3210. One or a first end of the water channel 3210 may be provided outside of the main body 3200. For example, one or a first end of the water channel 3210 may be provided on top of the main body 3200. The other or a second end of the water channel 3210 may face a water storage groove 1310 (see FIG. 5) of the heating plate 3300 so that water may flow to the water storage groove 1310 when water is supplied to the water channel 3210. Thus, a user can generate steam by supplying water while the cooking appliance is operating.

Embodiments disclosed herein provide an electromagnetic induction heating cooking appliance capable of improving heating efficiency and capable of shortening heating or cooking time by heating food accommodated in a cooking space part or cooking space from a top and bottom simultaneously. Embodiments disclosed herein provide an electromagnetic induction heating cooking appliance in which food or a food container may be conveniently placed into or taken out of a cooking chamber or cooking space.

Embodiments disclosed herein provide an electromagnetic induction heating cooking appliance in which food may be heated more quickly and more efficiently with an infrared heater and an electromagnetic induction heating module or heater, thereby improving heat transfer. Embodiments disclosed herein provide an electromagnetic induction heating cooking appliance capable of generating steam at the time of heating without additional water supply by forming a water storage groove in the heating plate. Embodiments disclosed herein provide an electromagnetic induction heating cooking appliance that may be easily cleaned and conveniently used.

In accordance with an embodiment, a heating unit or heat emitter may be provided on one or a first side of a cooking space where a heating plate is accommodated, and an electromagnetic induction heating module or heater may be provided on another or a second side of the cooking space. Food or a food container placed on a heating plate may be thus efficiently heated from both sides or at least two different sides. The heating plate or the bottom board where food or a food container is placed may be coupled with a door. When the door opens or closes the cooking space of a main body, the heating plate or the bottom board may be drawn out of or into the cooking space, thereby allowing the food or the food container to be conveniently placed into or taken out of the cooking space. An infrared heater may be mounted on an upper portion of the cooking space in which food or a food container is accommodated, and an induction heating module or induction heater may be mounted on a lower portion of the cooking space. The food can therefore be heated quickly and efficiently.

A water storage groove may be formed in the heating plate. Thus, it is possible to provide steam at the time of heating. The heating plate or the bottom board where food or a food container is placed may be coupled with the door. The heating plate is supported on the bottom board such that it is easy to clean the cooking appliance.

According to an embodiment, food can be heated from both or multiple sides such that the food can be heated evenly, more efficiently, and more quickly, such that the heating time is reduced. According to an embodiment, food or a food container may be easily put into or taken out of a cooking chamber through a heating plate or a bottom board coupled to a door, thereby preventing contamination of the appliance.

According to an embodiment, food can be heated quickly and efficiently with an infrared heater and an electromagnetic induction heating module or heater such that heat transfer can be improved. Further, steam may be supplied during heating without supplying water separately, such that moisture can be selectively supplied to the food that is heated. According to an exemplary embodiment, an electromagnetic induction heating cooking appliance may be easily cleaned and conveniently used.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electromagnetic induction heating cooking appliance, comprising:
a main body;
a heating plate comprising a magnetic substance;
a cooking space formed in the main body in which the heating plate is accommodated;
an electromagnetic induction heater that supplies an induced current to the heating plate;
a heat emitter that heats food placed on the heating plate, wherein the electromagnetic induction heater and the heat emitter are provided on different sides of the cooking space, respectively, wherein the electromagnetic induction heater is mounted on a first side of the main body and the heat emitter is mounted on a second side of the main body; and
a door that opens and closes the cooking space, wherein the door is detachably coupled with the main body and coupled with the heating plate such that the heating plate is drawn out of the cooking space when the door opens the cooking space, and is inserted into the cooking space when the door closes the cooking space, wherein a water storage groove is provided in the heating plate such that water placed in the water storage groove turns into steam when it is heated, a water channel is provided in the main body, and an end of the water channel faces the water storage groove such that water supplied from outside of the main body flows to the water storage groove.

2. The cooking appliance of claim 1, wherein the heat emitter comprises:
a heat generator that emits heat toward the heating plate; and
a reflection plate that reflects the heat emitted from the heating plate back to the heating plate.

3. The cooking appliance of claim 2, wherein the heat generator is an infrared heat generator.

4. The cooking appliance of claim 1, wherein the electromagnetic induction heater comprises:
a working coil that generates the induced current; and
a bottom board that supports the heating plate and is provided between the working coil and the heating plate.

5. The cooking appliance of claim 4, wherein the bottom board is a ceramic plate through which the induced current passes.

6. The cooking appliance of claim 1, wherein the electromagnetic induction heater further comprises a temperature sensor that measures a temperature of the heating plate, wherein an end of the temperature sensor is inserted into a hole formed in the bottom board, and comes in contact with the heating plate.

7. The cooking appliance of claim 1, wherein the door comprises a holding portion that holds food or a food container, wherein the holding portion is drawn out of the cooking space when the door opens, and is inserted into the cooking space when the door closes such that it is in contact with the heating plate.

8. The cooking appliance of claim 7, wherein the holding portion comprises:

wires on which the food or the food container are placed;
holding members coupled with the wires; and
wheels coupled to both sides of the holding members, respectively.

9. The cooking appliance of claim 8, wherein the main body further comprises a guide frame that guides the holding portion, wherein the guide frame includes seating grooves in which the wheels of the holding portion are inserted, and wherein the seating grooves are formed on both ends of the guide frame with respect to a direction in which the wheels move.

10. The cooking appliance of claim 8, wherein the holding members include door coupling grooves that detachably couple with the door, and wherein the door includes coupling protrusions that fit into the door coupling grooves, respectively.

11. An electromagnetic induction heating cooking appliance, comprising:
a heating plate accommodated in a cooking space;
a first heater; and
a second heater, wherein the first heater supplies heat to the heating plate via an induced current, and the second heater emits heat directly toward food or a food container placed on the heating plate, wherein the heating plate includes a magnetic substance, and wherein the second heater comprises:
an infrared heat generator; and
a reflection plate that reflects the heat emitted from the heating plate back to the heating plate, wherein the first heater and the second heater face each other, the heating plate is provided between the first heater and the second heater, and the heating plate further includes:
a plurality of grill protrusions that form grill marks on food placed on the heating plate and a water storage groove, wherein a water channel is provided through which water from outside of the cooking appliance flows to the water storage groove.

12. The cooking appliance of claim 11, wherein food or a food container placed on the heating plate is simultaneously heated by the first heater, the second heater, and steam generated from water placed in the water storage groove.

13. An electromagnetic induction heating cooking appliance, comprising:
a heating plate including a magnetic substance;
a main body defining a cooking space, wherein the heating plate is configured to be inserted into and withdrawn from the cooking space;
an electromagnetic induction heater that supplies an induced current to the heating plate;
a heat emitter that heats food placed on the heating plate, wherein the electromagnetic induction heater and the heat emitter are provided on different sides of the cooking space, respectively;
a groove formed in the heating plate to hold water such that water placed in the groove turns into steam when the induced current is supplied to the heating plate; and
a channel provided in the main body and having an end facing the groove such that water supplied from outside of the main body flows to the groove via the channel.

* * * * *